United States Patent Office 3,469,275
Patented Sept. 30, 1969

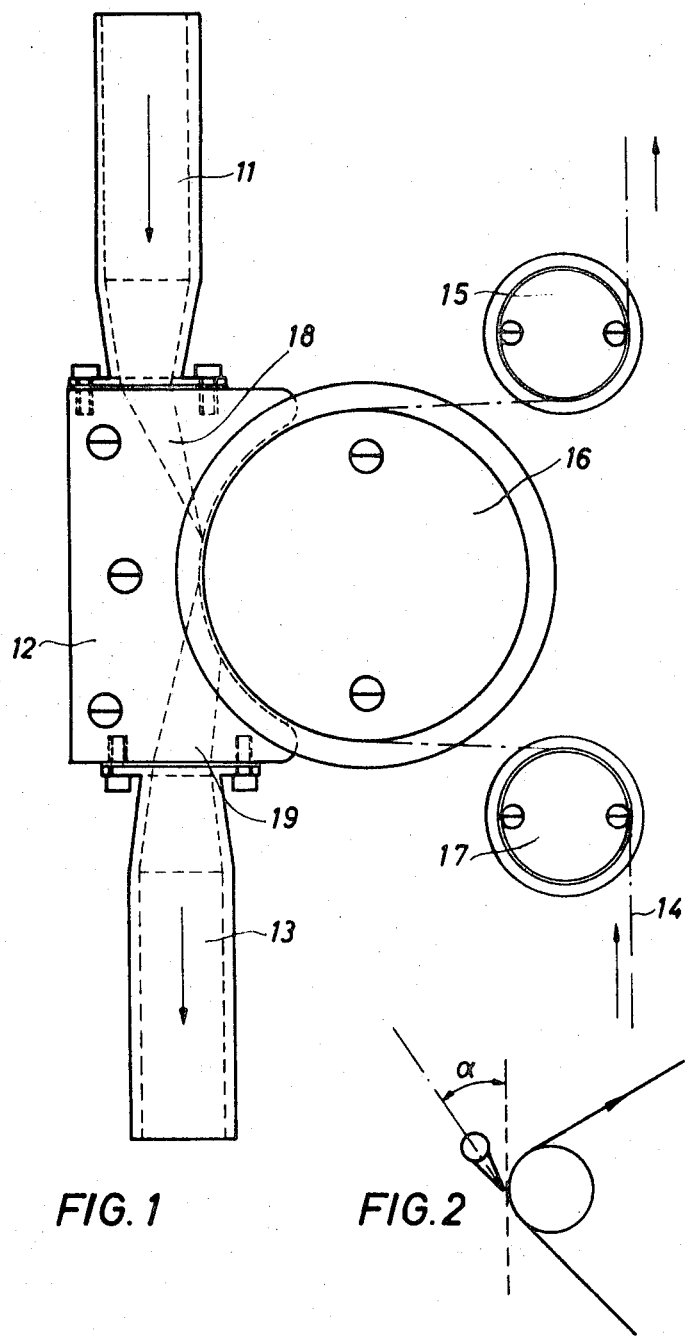

3,469,275
APPARATUS FOR THE CONTACTLESS REMOVING
OF DUST FROM WEBS
Lucien Roger Deschuttere, Antwerp, Ludo Adriaan
Scharpe, Mortsel-Antwerp, Walter Malvine Schaltin,
Muizen, and Gustaaf Joannes Peeters, Wilrijk-Antwerp,
Belgium, assignors to Gevaert-Agfa N.V., Mortsel, Belgium, a Belgian company
Filed Nov. 22, 1966, Ser. No. 596,156
Claims priority, application Great Britain, Nov. 22, 1965,
49,536/65
Int. Cl. A47l 5/38, 5/14, 15/00
U.S. Cl. 15—306                    8 Claims

ABSTRACT OF THE DISCLOSURE

An apparatus for removing dust from a moving web passing over a convexly curved supporting surface, such as a roller, in which a housing constructed to direct an air stream against the curved web in a more or less tangential direction and withdraw the air under suction in a generally opposite direction extends across the web in close proximity thereto, the housing being contoured for a close fit with a portion of the curved supporting surface and the supporting surface and the housing are formed adjacent the lateral limits of the web with opposed generally radially directed surfaces which overlap with one another in tight relation so as to minimize lateral escape of the air from the housing. Such surfaces can be formed as flanges at the sides of the houses and as flanges or shoulders on the supporting surface or roller.

---

Figure 3:
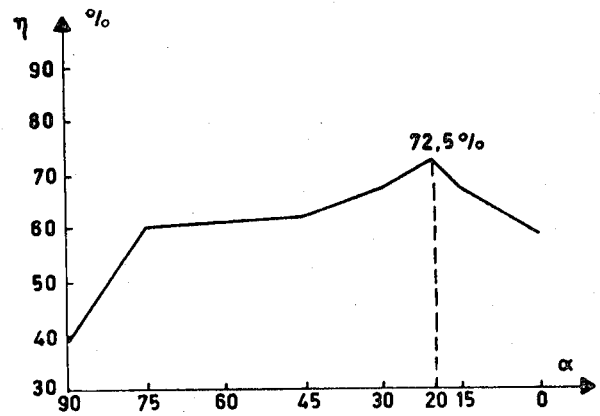

The present invention relates to an apparatus for the contactless removing of dust from supports and, more particularly, from film webs.

It is known to perform the contactless removal of dust from film webs by passing the web over two rollers, striking the film surface with a stream of air at an area located between the two rollers where the film follows a straight course, and removing the air which has become laden with dust.

The cited technique shows several inconveniences. The web tension between the two rollers must be controlled in order to avoid excessive vibration of the web. The extremity of the nozzle producing the stream of air must remain remote from the web surface over a distance of several millimeters in order to avoid the risk for the web to become touched whilst vibrating. As a consequence thereof the air pressure for feeding the nozzle need be relatively high.

Further, in the application of the mentioned technique a strong noise produces which extremely tires the operator concerned with the apparatus.

It has been found that the mentioned inconveniences greatly disappears, and the efficiency considerably increases, when the web is passed over a backing member so that the web follows a curved course at the area where the air stream strikes the web. Besides a firm security against vibration the novel measure ensures also a better removal of the dust. The said better removal is believed to be substantially due to the curving of the web, which creates a slight stretching thereof so that the dust particles becomes already loosened to some extent.

Thus, according to the present invention, apparatus for contactlessly removing dust from a web comprises means for advancing the web over a path that is curved in a plane normal to the web and parallel to its longitudinal direction, means for directing a stream of air at the convexly curved side of the web and extending transversely thereof, and means for removing the air after it has struck on the support.

Preferably, the air which is directed on the film is made to strike closely over the surface of the web in the form of a laminar stream of air. By avoiding or reducing in this way air-turbulencies, the risk of the deposition of removed dust on the interior side of the walls or other parts of the apparatus is greatly reduced.

Such a laminar stream of air may be produced in constituting the means for directing the stream of air and the means for sucking off the air by a body member with a concave side, which is curved generally according to the direction of curvature of the backing member and spaced closely from the periphery of the backing member, said body member being provided with two channels each terminating in an elongate slot which is located at the concave side of said body member and which extends transversely of the backing roller.

The invention has been particularly developed in connection with the contactless removal of dust from 35 mm. film webs. The said dust may be environ-mental dust, or dust which is produced when providing the film web with sprocket holes at the margins. In winding up the film, the dust particles become pressed between the successive windings of the film spool. Upon exposing, and partly also upon processing the film, the said particles remain adhering to the emulsion coating. The final result is that the projected image of a negative film is disturbed by a plurality of small bright spots and stripes.

The invention, however, is not limited to the removal of dust from 35 mm. film webs, and although reference is particularly made to such film webs in this specification, it will be understood that the invention extends also to other sizes of film webs. The invention may further be applied for removing dust from any other kind of photographic or other material in the form of a web.

For the same reason of development of the invention, the description deals particularly with the contactless removal of dust from a web, but it is clear that the invention is also suited for contactless removing dust from a support which forms an integral part of a device, e.g. a metal endless belt onto which a magnetizable composition is cast which after evaporation of the solvents is continuously stripped off and applied to a permanent support.

The term "web" denotes any flexible sheet which can be continuously fed from a reel or roll. The term includes coated and uncoated paper, plastics or other sheet material in such form.

Figure 4:
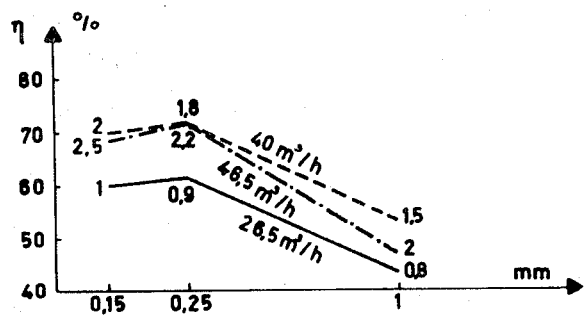
Figure 5:
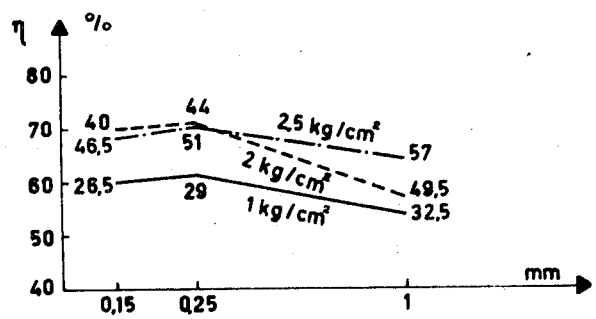
Figure 6:
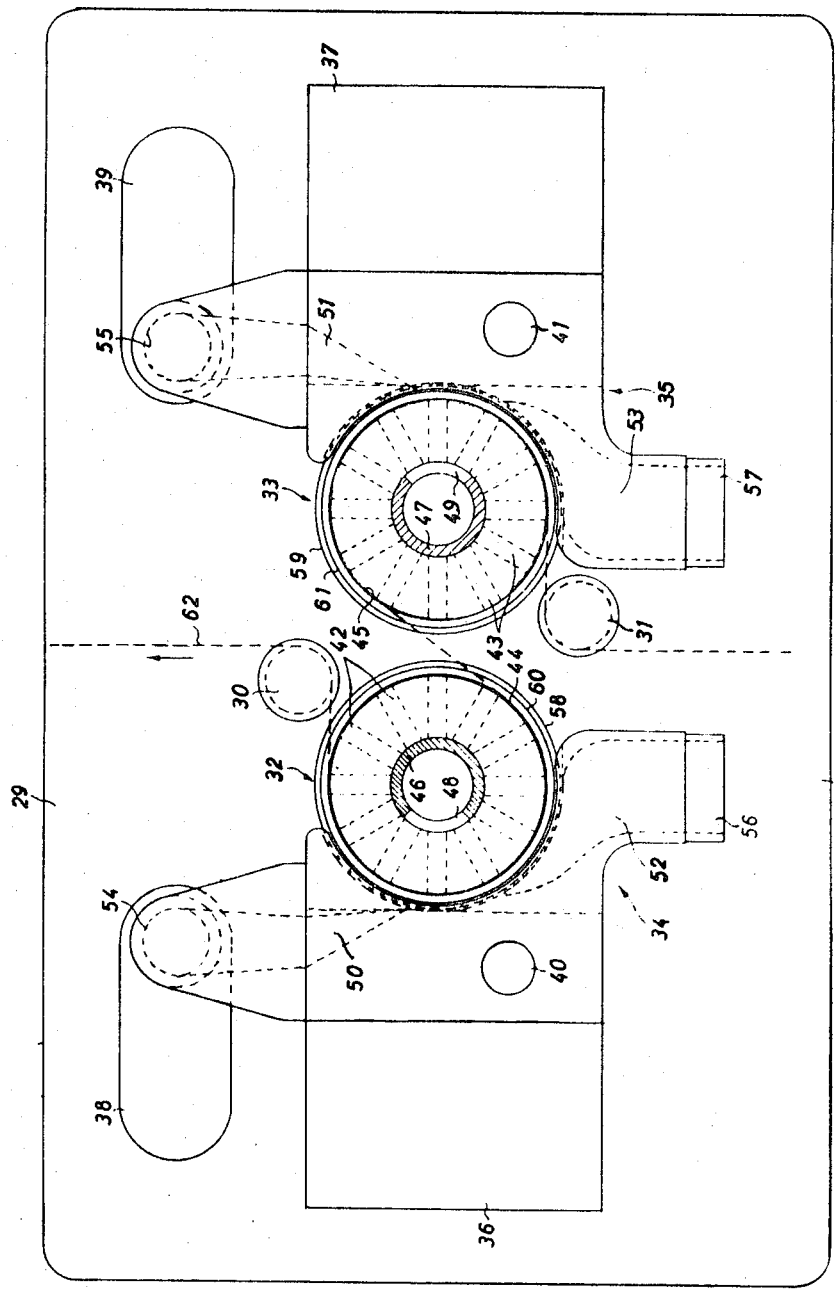
Figure 7:
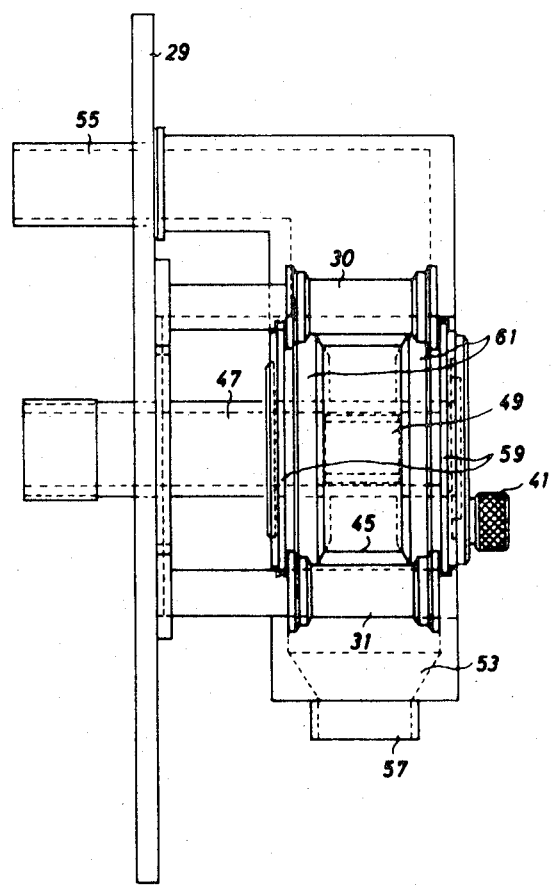

The invention will be further described with reference to the accompanying drawings in which:

FIG. 1 represents diagrammatically one form of the apparatus embodying the invention, FIG. 2 is a diagram showing the angle between the air stream and the web, FIG. 3 is a graph showing the efficiency of the apparatus as a function of the angle of the air stream, FIG. 4 is a graph showing the efficiency of the apparatus as a function of the width of the air gap, the output of the blower remaining constant, FIG. 5 is a graph showing the efficiency of the apparatus as a function of the width of the air gap, the air-pressure of the blower remaining constant, FIG. 6 represents another form of apparatus embodying the invention, FIG. 7 is a view of FIG. 6 from the left side, the left cleaning head and backing roller being removed.

The apparatus shown in FIG. 1 comprises a duct 11 through which pressurized air is fed to the dust removing head 12, and a duct 13 through which the air laden with dust is sucked off. A 35 mm. film web 14 which is drawn at a continuous speed from a take-off reel (not shown), passes around the idler roller 17, the backing roller 16, the idler roller 15, and thence to a take-up reel.

The backing roller 16 is a freely rotatable roller consisting of a core portion of a diameter of 60 mm., and two side flanges of a diameter of 70 mm. which, with their projecting rim portion, are closely spaced from the two flat side walls of the head 12.

The head 12 is provided with two wedge-like channels 18 and 19 which have a rectangular cross-section, the longer side measuring about 38 mm. The width of the opening of the channel 18 facing the film web is adjustable (not shown) and can be varied between 0.15 and 1 mm. The width of the opening of the channel 19 amounts to 35 mm., and the distance between the center of this opening and that of the opening of the channel 18 amounts to 30 mm. The distance between both openings and the periphery of the backing roller 16 amounts to 1.5 mm.

The duct 11 is provided with measuring means for indicating the air pressure in kg./cm.$^2$ and the air input in m.$^3$/h., and the duct 13 with measuring means for indicating the under-pressure in mm. Hg. In order to compare the results which are obtained for the different settings of the apparatus, it was proceeded as follows.

A conventional 35 mm. film web which is provided with a light-sensitive emulsion coating at one side is continuously unwound from a roll and passed horizontally, the emulsion side facing upwardly, through a device for applying a layer of carbon black to the emulsion side of the film. The said device comprises a small holder containing the carbon black powder, and a vibrating member extending transversely above the film web and having a length of about 15 mm., to which the carbon black powder continuously flows from the holder and which uniformly disperses the carbon black powder onto the film over a width of about 15 mm. The maximum size of the powder particles amounted to 6 μm.

The film web is continuously rewound, and the carbon black becomes pressed between the successive windings. When the film is unwound again, it appears that the carbon black firmly adheres to the emulsion coating of the film and virtually no powder detaches from the film surface.

The removal of the powder by the apparatus according to the invention was measured as follows.

The film roll provided with carbon black is unwound again, and the optical transmission of the film web is measured by means of a transmission meter, the spot size of which amounts to 1 sq. cm. The transmission meter was thus adjusted that on a linear scale ranging from 0 to 100, a reading of 100 was obtained when a web portion was measured to which no carbon black had been applied. A web portion provided with carbon black showed a reading of about 50.

The yield of the removal of the carbon black was calculated as follows.

The reading of the transmission meter being $x$ for a web portion carrying the carbon black before and being $y$ for the same web portion after passing the apparatus for removing the carbon black, the yield of the system is given by the following equation:

$$\eta = \frac{y-x}{100-x} \cdot 100$$

For determining the most favourable angle through which the air stream strikes the web, a web which has been provided with carbon black powder as described above and the value $x$ of which has been determined, is passed over a backing roller and subjected to a stream of air produced by an air-knife the direction of which is adjustable in respect of the web. The direction at which the stream of air strikes on the web is indicated by the angle $\alpha$, being the angle between the stream of air and the tangent to the backing roller which intersect each other at the point where the stream of air touches the roller or the web thereon (see FIG. 2), the stream of air being diagrammatically represented by a dash and dot line.

The position of the air-knife was changed from 0 to 90° and the yield was determined on hand of about 60 measurements. The yield $\eta$ as a function of the angle $\alpha$ is shown in the graph of FIG. 3. It appears that the most favourable angle is about 20°.

For determining the most favourable width of the opening through which the air is directed onto the film surface, two parameters must be taken into account, viz. the air ouput and the air pressure.

Therefore two measurements are made wherein each time one parameter is kept constant, and the other is changed.

The measurements were performed by means of the apparatus according to FIG. 1. The speed of the web amounted to 20 cm./s.

In FIG. 4 the efficiency of the system is plotted against the width of the opening for some air outputs. At three points of each curve a numeral indicates the air pressure in kg./sq. cm. as it has been measured for the particular setting of the opening.

In FIG. 5 the efficiency of the system is plotted against the width of the opening for some air pressures. At three points of each curve a numeral indicates the air output in m.$^3$/h. as it has been measured for the particular setting of the opening.

For both measurements, an underpressure of 40 mm. Hg was maintained in the duct 13.

It appears from both graphs that the opening of 0.25 mm. is most favourable. The data of the air supply as measured in the duct 11 are then as follows: air pressure $p=2$ kg./cm.; air output $Q=44$ m.$^3$/h.

An average value for the yield which has been obtained with the apparatus according to the present invention in the removal of carbon black from different types of film is 70%.

The apparatus according to the invention can be used for smaller or larger webs, provided the length of the openings of the channels 18 and 19, the air output, and the length of the backing roller are accordingly adapted.

The underpressure which prevails in the channel 19 is not critical. The only function of this channel is to carry off the quantum of air which is continuously directed to the web surrface from the channel 18. The removal of dust from the web surface merely by the suction developed at the end of the channel 19 facing the web, is neglectable compared to the dust which is removed by the stream of air directed to the web surface.

In case a uniform cleaning of a web at both its sides is required, the web may be passed a second time, or be passed through a second apparatus, its backside facing then the blow off and the suction openings of the channels 18 and 19.

The described apparatus has shown to be extremely quiet in operation. Moreover, no particular soiling of the interior of the apparatus was noticed. Both favourable effects must be contributed to the laminar streams of air in the apparatus.

An improved apparatus is shown in FIGS. 6 and 7; the apparatus is intended for cleaning the web at both its sides, and therefore comprises two cleaning stations.

The cleaning stations are mounted on a vertical support plate 29, and they comprise the idler rollers 30, 31, the backing rollers 32, 33 and the cleaning heads 34, 35. The idler rollers and the backing rollers are mounted on stationary shafts, whereas the cleaning heads are slidably fitted so that they may horizontally be removed from and approached towards the backing rollers in order to permit the easy insertion of the web to be cleaned.

In order that the mentioned displacement of the heads be permitted rectangular openings 36, 37 as well as elongate opening 38, 39 are provided in the support plate 29. The heads are locked and unlocked by means of a mechanism not shown, which is controlled by the knobs 40, 41.

The backing rollers are provided with a plurality of slots 42, 43 which run parallel to the roller axis and which extend radially from a peripheral part 44, 45 of reduced diameter to a stationary cylindrical hollow core member 46, 47 which communicates with the slots 42, 43 through an opening 48, 49.

At either side the backing rollers are provided with projecting rim portions 58, 59 which fit into corresponding grooves in the heads when said heads are in the operative position. The peripheral portions 60, 61 which lie inside said projecting rim portions, support the web at its marginal portions only.

The heads 34, 35 are provided with the wedge-like blowing channels 50, 51 and the curved suction channels 52, 53. Through the ducts 54, 55 pressurized air is fed to the heads, whereas the air laden with dust is sucked off through the ducts 56, 57.

When the apparatus is in operation, the web to be cleaned follows a path 62 indicated in broken lines.

The advantages of the apparatus over the apparatus described hereinbefore are particularly interesting in the treatment of perforated film webs, e.g. conventional 35 mm. film.

In fact, in cleaning films of the described kind with the apparatus according to FIG. 1, it has been noticed that the air blown into the film surface penetrates through the sprocked holes to the backside of the film, and thereby tends to establish an air-cushion between the backing roller and the film whereby the film may start to vibrate and its course may become irregular.

The mentioned difficulties do not occur with the arrangement according to FIGS. 6 and 7 wherein, owing to the central portion of reduced diameter of the backing rollers and the slots through which an underpressure is maintained, no overpressure can arise at the backside of the web.

The arrangmeent according to FIGS. 6 and 7 has still another advantage. Since at one side of the web an overpressure is established, and at the other side an underpressure exists, a flow of air will pass through the sprocket holes. Thereby also dust particles adhering to the edges of the sprocket holes will be removed effectively.

The suction channels 52, 53 have a greater opening and a more streamlined form than the channel 19 of the embodiment according to FIG. 1. Thereby the cleaning will be more efficient than with the arrangement according to FIG. 1.

The apparatus according to the invention may be used in conjunction with other known techniques for removing dust, such as the ultrasonic treatments, the transport of the web through an electrostatic field, the ionizing of the web by means of a corona discharge and the successive precipitation of the dust onto electrodes of polarity opposite to that of the corona electrodes.

In case the dust caused by the sprocket holes in a film is particularly intense and the use of the apparatus according to the invention is not entirely successful, the application of the apparatus according to the invention may occur in combination with other apparatus wherein streams of air are directed almost normal to the film at its marginal zones, and wherein the air is sucked off at the backside of the film through the sprocket holes.

We claim:

1. Apparatus for removing dust from a web without contacting the web, comprising guide means for guiding said web through a fixed path, said guide means including an arcuate supporting surface, whereby a portion of said path is curved; means for advancing said web through said path; and air flow directing means including a housing extending generally transversely of the web adjacent the surface thereof opposite said arcuate surface, said housing having a curved inner face extending in closely spaced parallel relation to the curved portion of the web path, side walls terminating adjacent the web side edges and parallel thereto, and means defining therein two substantially opposed, narrow, transverse air passageways, said passageways opening through closely spaced, parallel slot-like openings in said inner housing face and extending in opposite directions outwardly from said openings at oblique angles relative to said web, means for supplying air under pressure to one of said passageways and for removing air through said other passageway; and lateral air flow preventing means comprising cooperating radially-directed surfaces on said housing inner face and said arcuate surface which cooperating surfaces lie in proximate overlapping relation over substantially the entirety of the common curvature of housing side walls and arcuate surface.

2. Apparatus as in claim 1 wherein said passageways flare outwardly from said slot-like openings.

3. Apparatus as in claim 1 wherein the dimension of said opening of the air removal passageway in the direction of web travel substantially exceeds the corresponding opening of the air supply passageway.

4. Apparatus as in claim 1 wherein said air supply passageway extends from said opening at an angle of about 20° with respect to a tangent to said arcuate surface.

5. Apparatus as in claim 1 wherein said arcuate supporting surface is a cylindrical drum.

6. Apparatus as in claim 5 wherein the surface of said drum is perforated to prevent the formation of an air cushion between the web and such surface.

7. Apparatus as in claim 1 wherein said arcuate supporting surface includes radially-projecting side flanges overlapping with the side walls.

8. Apparatus as in claim 7 wherein said side flanges project into a groove provided on the inner face of said housing.

References Cited

UNITED STATES PATENTS

| | | |
|---|---|---|
| 2,082,411 | 6/1937 | Merrill. |
| 2,962,747 | 12/1960 | Ford. |
| 3,266,196 | 8/1966 | Barcaro _____ 15—306 X |

ROBERT W. MITCHELL, Primary Examiner

U.S. Cl. X.R.

15—345